(12) United States Patent
Hiramatsu

(10) Patent No.: US 6,923,042 B2
(45) Date of Patent: Aug. 2, 2005

(54) IGNITION APPARATUS FOR INTERNAL COMBUSTION ENGINE

(75) Inventor: Hiromi Hiramatsu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/661,521

(22) Filed: Sep. 15, 2003

(65) Prior Publication Data

US 2004/0079139 A1 Apr. 29, 2004

(30) Foreign Application Priority Data

Sep. 19, 2002 (JP) .................................... 2002-272711

(51) Int. Cl.[7] .............................................. G01L 23/22
(52) U.S. Cl. ...................................... 73/35.12; 73/115
(58) Field of Search ............................. 73/35.01, 35.07, 73/35.12, 35.13, 112, 115, 116, 117.2, 117.3, 118.1

(56) References Cited

U.S. PATENT DOCUMENTS

2003/0183215 A1 * 10/2003 Miwa et al. ................. 123/634
2003/0183218 A1 * 10/2003 Maekawa et al. ........... 123/635
2004/0083795 A1 * 5/2004 Butler et al. ................ 73/35.12

FOREIGN PATENT DOCUMENTS

| JP | 61-224288 | 10/1986 |
|----|-----------|---------|
| JP | 64-54686  | 3/1989  |
| JP | 1-283786  | 11/1989 |
| JP | 2900034   | 3/1999  |
| JP | 2900061   | 3/1999  |

* cited by examiner

Primary Examiner—Eric S. McCall
(74) Attorney, Agent, or Firm—Nixon & Vanderhye P.C.

(57) ABSTRACT

An earth electrode is formed on the brim surface of the plug insulator and on the outer surface of the middle portion of the plug insulator along the axial direction. The earth electrode connected with one side of the combustion pressure sensor is provided on a whole surface opposite to a combustion pressure signal electrode. The earth electrode works also a shield member for shielding the high frequency noise generated inside the insulator. A part of the outer side of the earth electrode is covered by an insulating layer for insulating the earth electrode from the combustion pressure signal electrode. The combustion pressure sensor held between the insulator brim and electrode brim is given a prescribed compression load by a metal cylindrical bolt which presses down the electrode brim of the toward the combustion pressure sensor.

7 Claims, 8 Drawing Sheets

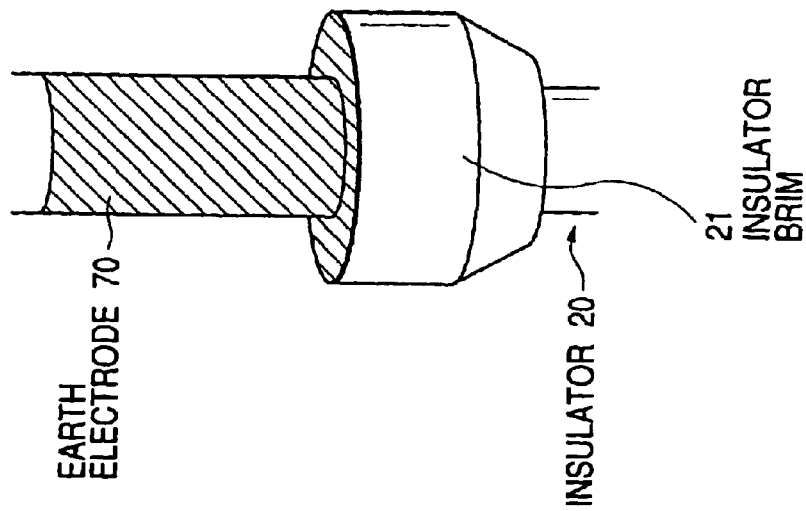
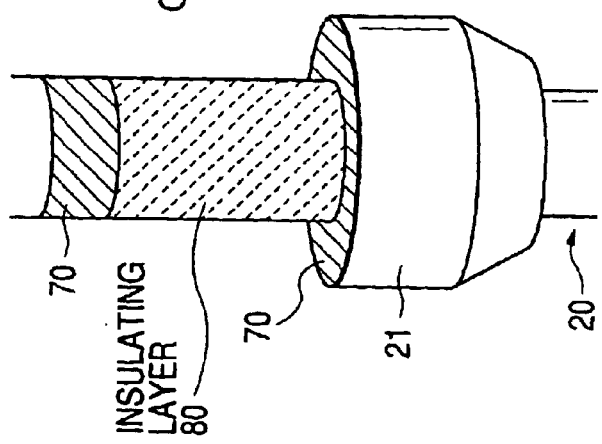
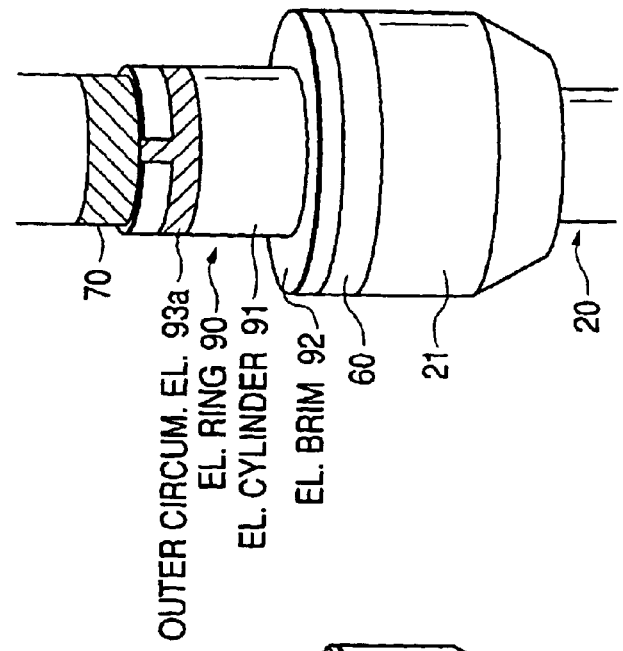

IGNITION APPARATUS FOR INTERNAL COMBUSTION ENGINE

BACKGROUND OF THE INVENTION

1. Field of the Invention

The present invention relates to an ignition apparatus with a combustion pressure sensor for an internal combustion engine used for an automobile, co-generation and gas pressure pump.

2. Description of the Related Art

There is disclosed a conventional ignition apparatus with a combustion pressure sensor in JP64-54686A, 1989, wherein the combustion pressure sensor and its lead wire buried in a plug cap are fixed around the spark plug.

However, the above-mentioned conventional ignition apparatus has a disadvantage that the combustion pressure is not precisely measured, because the ignition noise is superposed on a signal electrode and signal output electrode provided between the combustion pressure sensor and its lead wire, although the lead wire itself is shielded and noise-free.

SUMMARY OF THE INVENTION

An object of the present invention is to prevent an ignition noise from superposing on a combustion pressure signal through a signal electrode and signal output electrode, thereby precisely detecting the combustion pressure.

The ignition apparatus of the present invention for an internal combustion engine comprises: a spark plug wherein a signal electrode for detecting a combustion pressure is provided at an outer circumference of a plug insulator with a built-in center electrode; a holding member which covers the outer circumference of the plug insulator and has a signal terminal connected with the signal electrode; and a plug cap fixed to the holding member, covers the outer circumference of the plug insulator and is connected with an ignition coil.

The ignition apparatus of the present invention is characterized in that: an electrically grounded shield member is provided on the outer circumference of the plug insulator; and the shield member is insulated from the signal electrode.

According the ignition apparatus of the present invention, it is prevented or suppressed that the ignition noise is superposed through the combustion pressure signal electrode and signal terminal onto the combustion pressure signal. Thus, the combustion pressure is precisely detected.

The present invention has a further Features as stated below.

A Feature is that the insulation between the signal electrode and shield member is assured by the insulating member between them.

Another Feature is that the ignition noise superposition is surely prevented or suppressed by providing the shield member on a whole surface opposite to the signal electrode.

Still another Feature is that the ignition noise and electrical noise from other combustion chambers are shielded by the shield plate provided on the cap cover around the signal electrode and signal terminal.

BRIEF EXPLANATION OF THE DRAWINGS

FIGS. 4A, 4B and 4C show steps for manufacturing the earth electrode (shield member) 70, insulating layer (insulating member) 80, electrode ring (insulating body) 90 and combustion pressure sensor 60.

PREFERRED EMBODIMENT OF THE INVENTION

Figure 1:
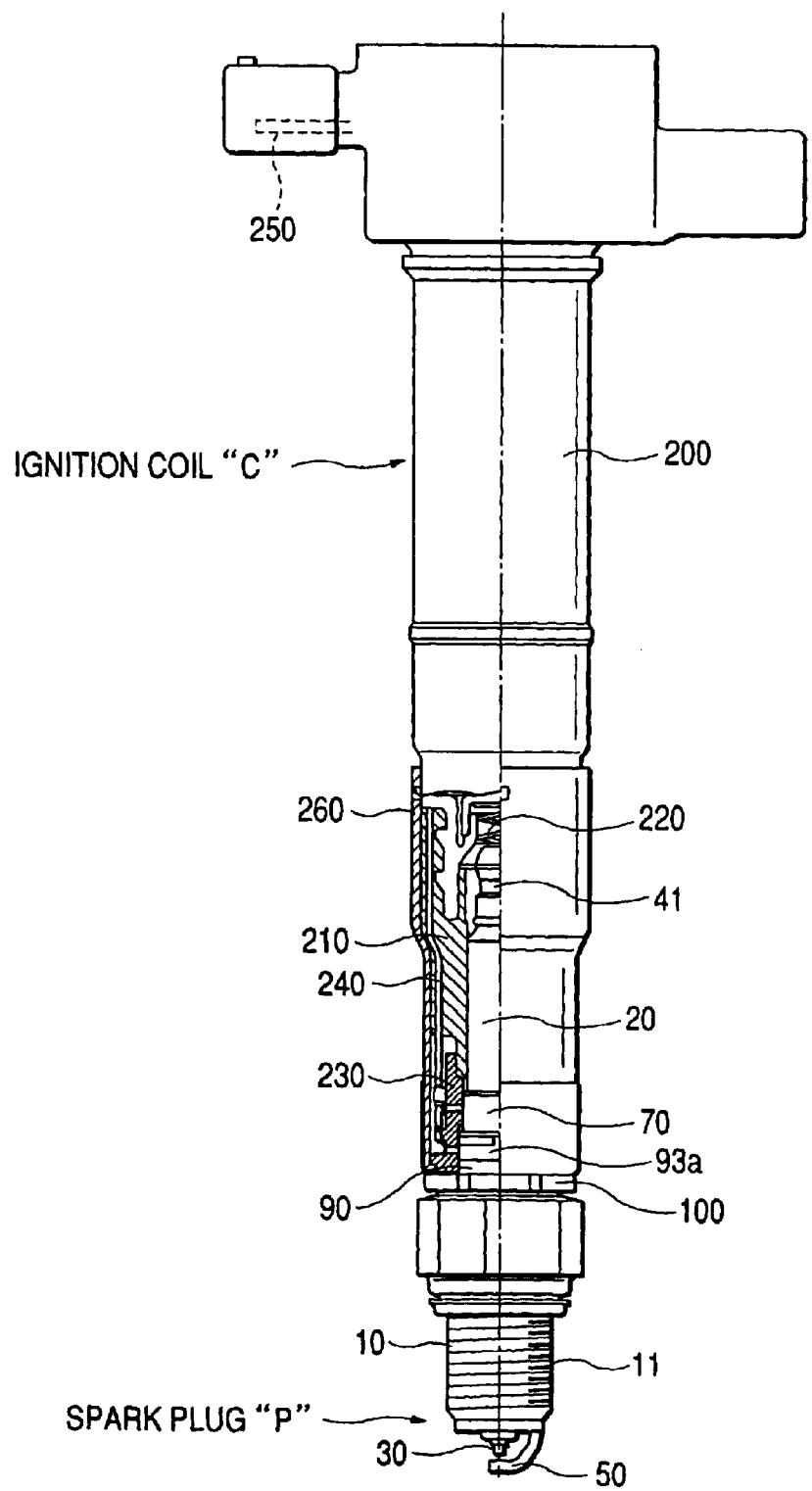
FIG. 1 is a partial cutaway elevational view of the ignition apparatus of Embodiment 1 of the present invention.

Preferred embodiments are explained, referring to the drawings.

Embodiment 1

FIG. 1 is a partial cutaway elevational view of the ignition apparatus of Embodiment 1 which includes a spark plug "P" for discharging a high voltage between a spark gap and ignition coil "C" for applying on the basis of a control signal from a not-shown igniter the high voltage to the spark plug "P".

Figure 2:
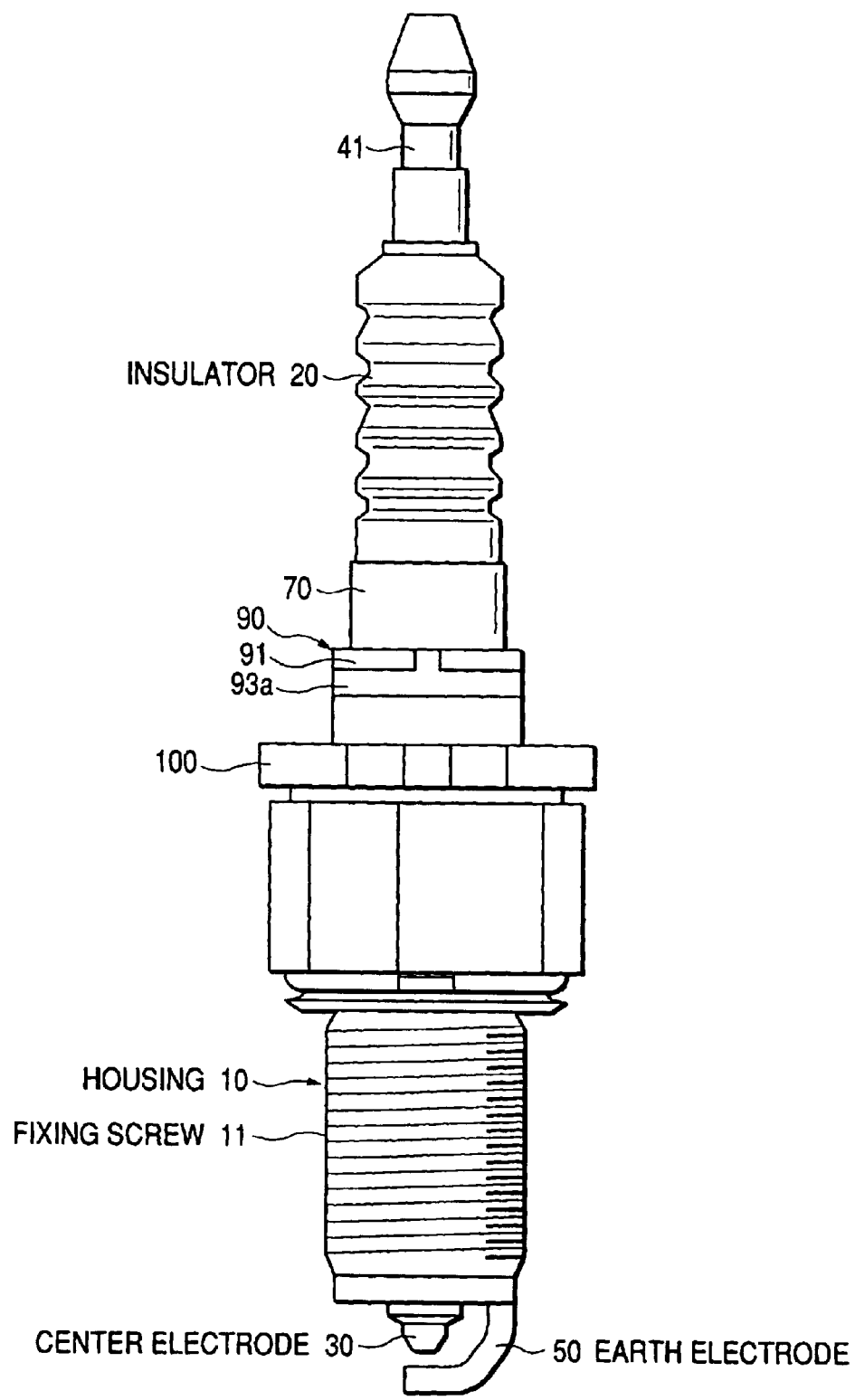
FIG. 2 is a elevational view of the spark plug "P" included in the ignition apparatus as shown in FIG. 1.

As shown in FIG. 2, the spark plug "P" has a housing 10 made of a steel, e.g., low-carbon steel. The housing 10 is provided with a fixing screw 11 by which the spark plug "P" is fixed to a cylinder head which forms a not-shown combustion chamber.

There is fixed inside the housing 10 a cylindrical insulator 20 made of, e.g., an electrically insulating alumina ceramics $Al_2O_3$. Further, a center electrode 30 is inserted into the hausing 10, while a stem 40 is exposed from the hausing 10.

There is formed on an outer circumference of the insulator 20 at its middle position along the axial direction an insulator brim 21 projecting outward, while there are fixed in an axial hole of the insulator 20 the center electrode 30 and stem 40 which are insulated from the housing 10.

The center electrode 30 is a cylinder of which inner side is made of a highly heat-conductive material, e.g., Cu and of which out side is made of a heat-resistive and corrosion-resistive material, e.g., Ni alloy. The tip surface of the center electrode is exposed from the tip of the insulator 20. Further, a terminal 41 formed at the tip of the metal stem 40 is exposed from the insulator 20.

The earth electrode 50 made of a Ni alloy is welded to the hausing 10 and is bent by about 90 degrees, thereby forming a spark gap between its tip and the tip of the center electrode 30. The earth electrode 50 is grounded together with an automobile body through the hausing 10.

Figure 3:
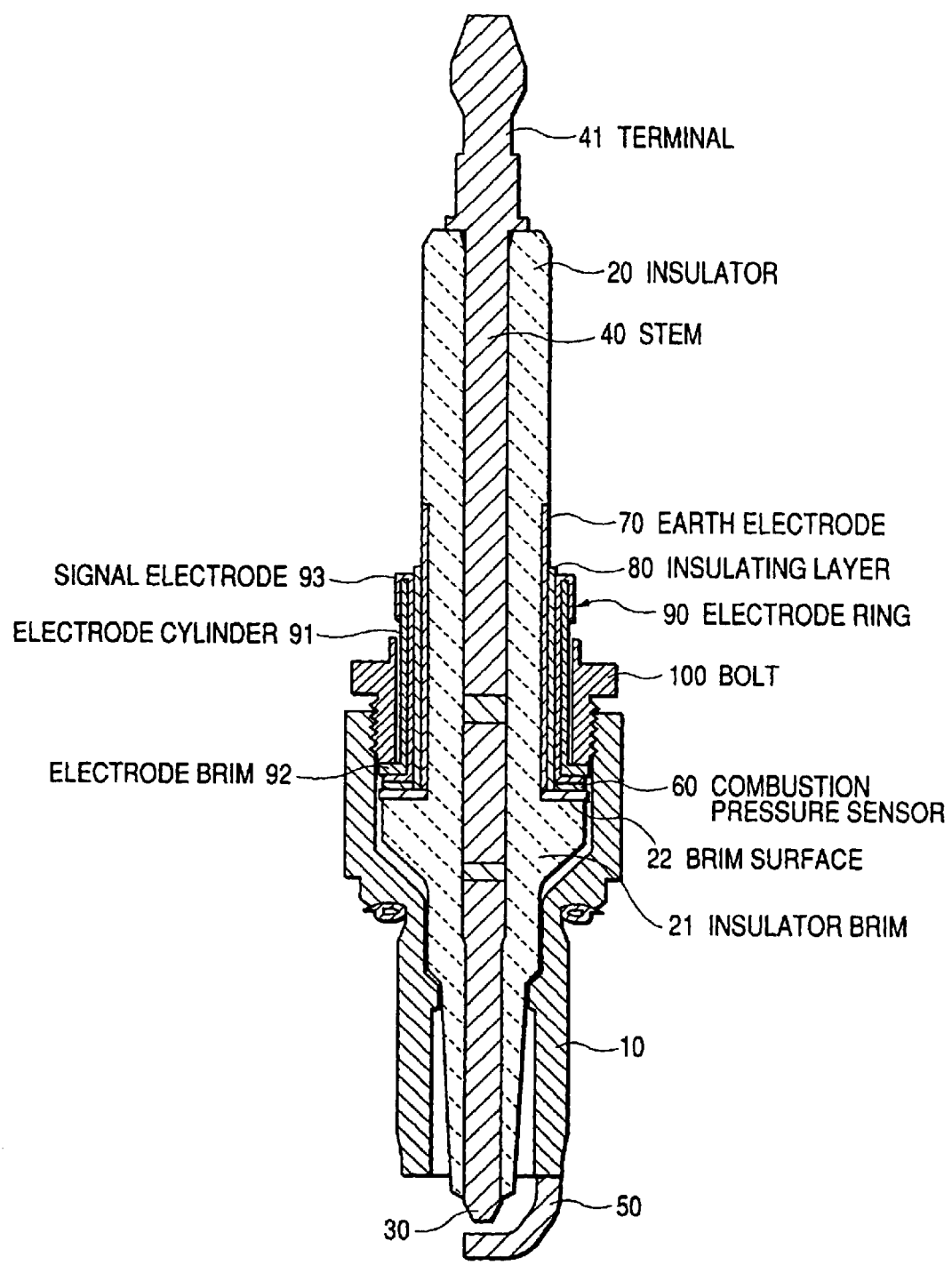
FIG. 3 is a elevational cross sectional view of the spark plug "P" included in the ignition apparatus as shown in FIG. 1.

As shown in FIG. 3, there is provided an earth electrode (shield member) 70 (connected with one side of a combustion pressure sensor 60) both on a brim surface 22 and on an outer surface at the middle portion of the insulator 20 along the axial direction.

As shown in FIG. 4A, the earth electrode (shield member) 70 is formed by coating and baking a conductive metal paste of, e.g., Ag and Ni. Further, the earth electrode (shield member) 70 is provided on a whole surface opposite to a combustion pressure signal electrode 93. Here, the earth electrode 70 works also a shield member for shielding the high frequency noise generated inside the insulator 20.

As shown in FIG. 4B, a part of the outer side of the earth electrode (shield member) 70 is covered by an insulating layer (insulating member) 80 of a glaze which is coated and baked. The insulating layer (insulating member) 80 insulates the earth electrode (shield member) 70 from the combustion pressure signal electrode 93.

As shown in FIG. 4C, the electrode ring (insulating body) 90 is provided on the outer circumference of the insulating layer (insulating member) 80.

Figure 5:
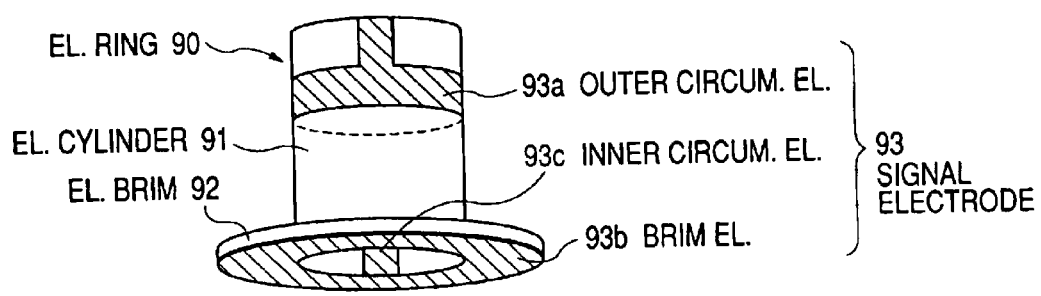
FIG. 5 is a perspective view of the electrode ring (insulating body) 90 as shown in FIG. 4C.

As shown in FIG. 5, the electrode ring (insulating body) 90 comprises: a electrode cylinder 91; and a electrode brim 92 projecting outward. The electrode cylinder 91 and electrode brim 92 in the electrode ring 90 are made of an insulating material, e.g., alumina ceramics $Al_2O_3$.

There is formed on the electrode ring (insulating body) 90 the signal electrode 93 made of the conductive metal paste of, e.g., Ag and Ni coated and baked. The signal electrode 93 comprises: an outer circumference electrode 93a formed on the outer circumference of the electrode cylinder 91; a brim electrode 93b on a surface (of the side of the insulator brim 21) of the electrode brim 92; and an inner circumference electrode 93c (formed on the inner surface of the electrode cylinder 91) for electrically connecting the outer circumference electrode 93a with the brim electrode 93b.

A combustion pressure sensor 60 for detecting a combustion pressure of a fuel mixture combusting in a combustion chamber is an annular piezoelectric element wherein a piezoelectric charge is changed by a load (pressure) on itself.

The combustion pressure sensor 60 is fixed on the outer circumference of the insulator layer (insulating member) 80 and held between the insulator brim 21 and electrode brim 92. Further, the combustion pressure sensor 60 is given a prescribed compression load by a metal cylindrical bolt 100 which presses down the electrode brim 92 toward the combustion pressure sensor 60, as shown in FIG. 3.

Figure 6:
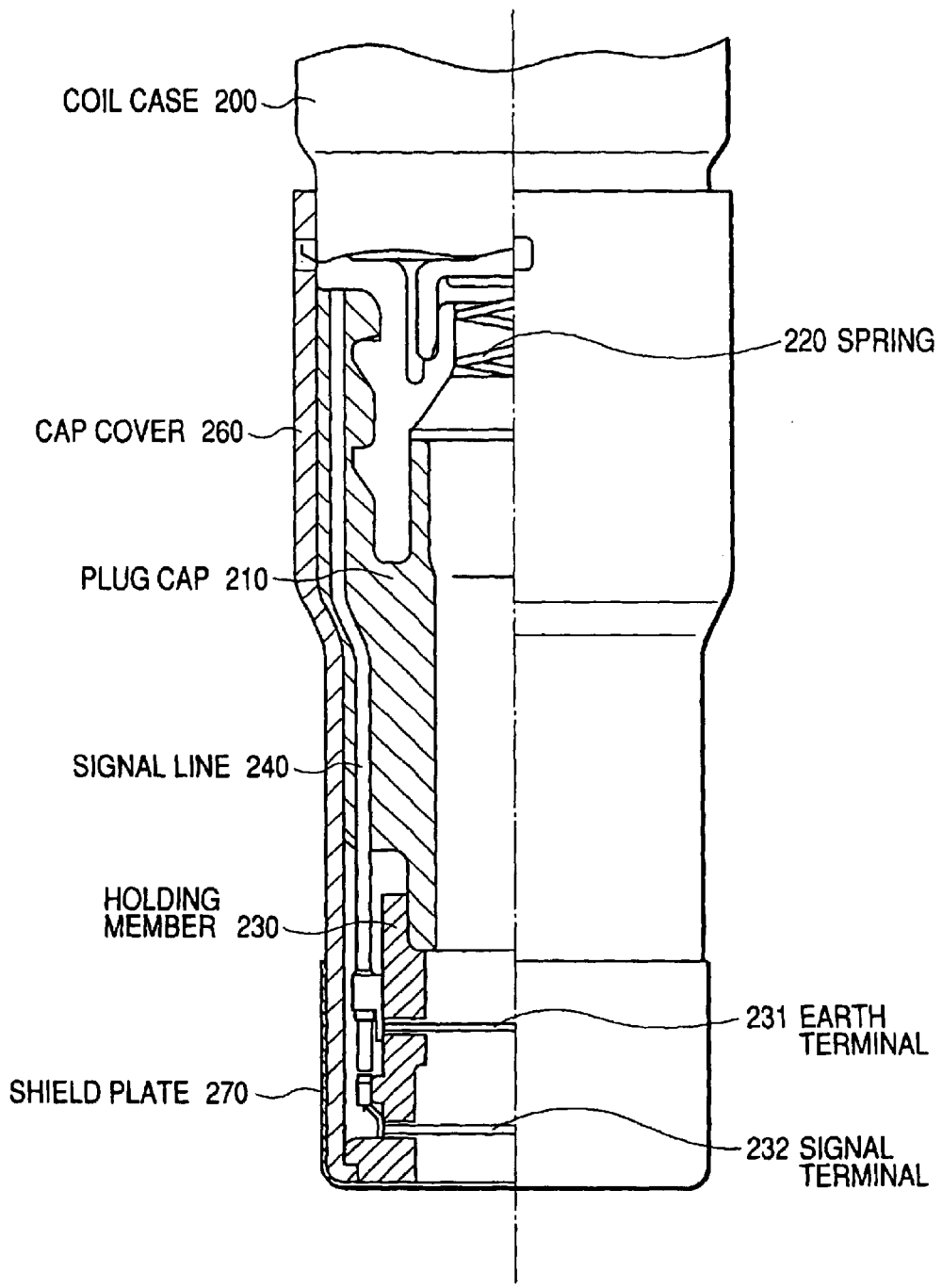
FIG. 6 is a partial cutaway elevational view of a main portion of the ignition coil "C" as shown in FIG. 1.

As shown in FIG. 6, there is provided inside a coil case 200 of the ignition coil "C" a ignition coil comprising a not-shown first and second coil. Further, an end of the coil case 200 is connected with a plug cap 210.

The plug cap 210 is a cap connector for electrically connecting the spark plug "P" with the ignition coil. Concretely, the high voltage side of the secondary coil is electrically connected through a electrically conductive spring 220 with the terminal 41 of the stem 40 as shown in FIG. 3 by fitting up the plug cap 210 on the terminal 41.

An end of the plug cap 210 is connected with a holding member 230 (made of a PPS resin cylinder) which holds an earth terminal 231 electrically connected with the earth electrode (shield member) 70 and a signal terminal 232 electrically connected with the signal electrode 93. Here, the plug cap 210 and holding member 230 construct a cap member.

A part of the earth terminal 231 positioned inside the holding member 230 is U-shaped in such a manner that the inner circumference surface of the U-shaped part is in contact with the earth electrode (shield member) 70, while another part of the earth terminal 231 positioned outside the holding member 230 is caulked and connected to a signal line 240 which is a shield line, e.g., a coaxial line coated by PTFE.

Further, a part of the signal terminal 232 positioned inside the holding member 230 is also U-shaped in such a manner that the inner circumference surface of the U-shaped part is in contact with the outer circumference electrode 93a, while another part of the signal terminal 232 positioned outside the holding member 230 is caulked and connected to a signal line 240.

The signal line 240 extends to another end of the coil case 200 and is connected with a terminal 250, as shown in FIG. 1.

The outer circumference of the plug cap 210 and holding member 230 are covered by a cylindrical PPS resin cap cover 260 for covering the connection points of signal line 240 and earth terminal 231 & signal terminal 232.

Further, the outer circumference of the cap cover 260 is covered by a shield member 270 made of a steel (e.g., SUS) which covers the signal electrode 93 and signal terminal 232. When the ignition coil "C" is fitted to the spark plug "P", an end of the shield plate 270 contacts the bolt 100 which is grounded through the hausing 10.

According to Embodiment 1, the high frequency noise generated from inside the plug insulator 20 during the discharge of the spark plug "P" is not superposed upon the pressure signal from the combustion pressure sensor 60, because the sensor 60 is shielded by the earth electrode 70. Thus, the combustion pressure is precisely detected.

The noise superposition is more completely prevented, due to the earth electrode (shield member) 70 provided on the whole surface of the signal electrode 93.

Further, the noise superposition is more completely prevented, due to the shield plate 270 which electrically shields the signal electrode 93 and signal terminal 232 from other spark plugs fixed to other combustion chambers.

Further, the signal electrode 93 is surely insulated from the earth electrode (shield member) 70, due to the insulating layer (insulating member) 80 between them.

Further, the manufacturing steps for the ignition apparatus are simplified, because the earth electrode (shield member) 70 is formed beforehand directly on the surface of the plug insulator.

Embodiment 2

Figure 7:
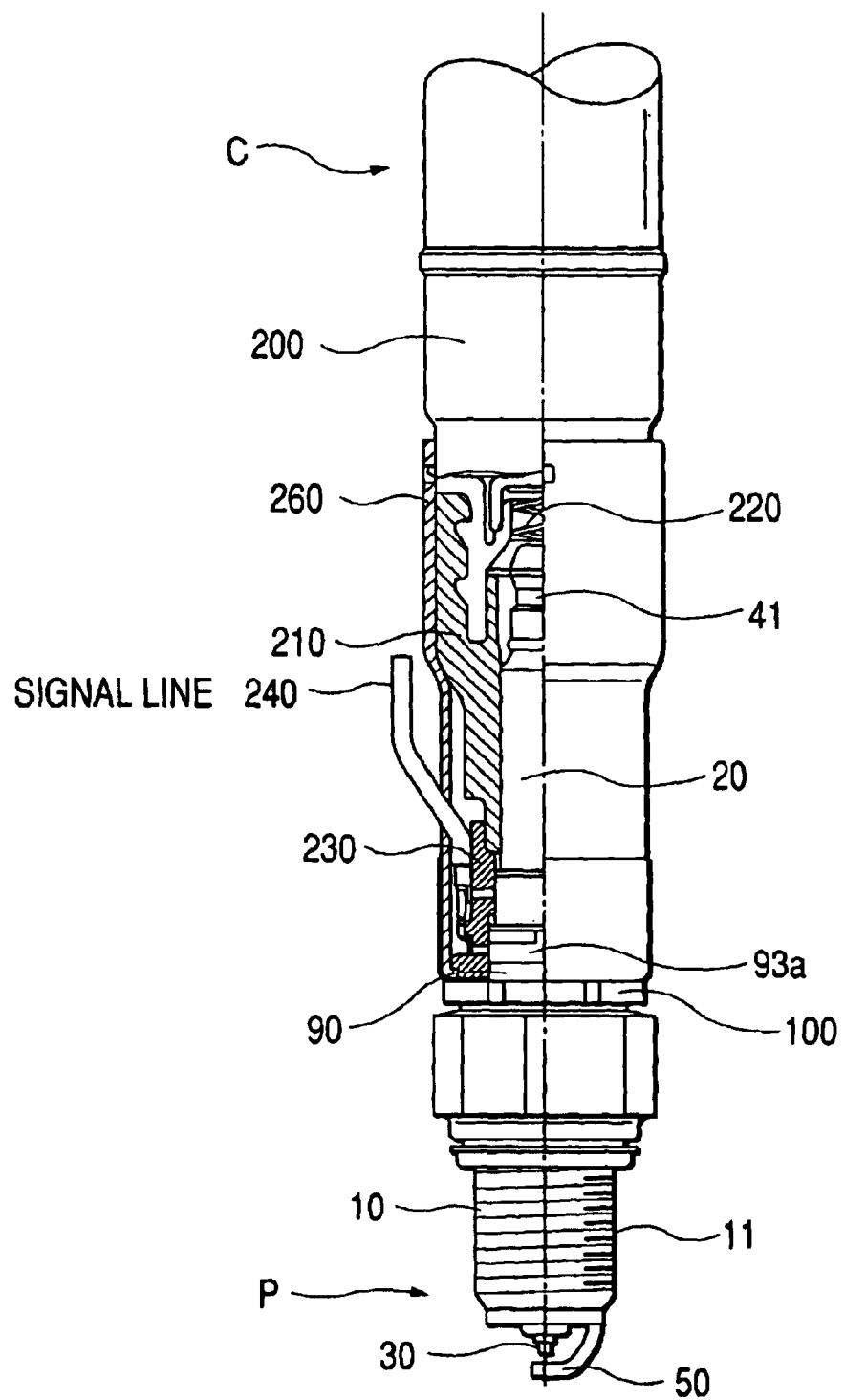
FIG. 7 is a partial cutaway elevational view of a main portion of the ignition apparatus of Embodiment 2.

FIG. 7 is a partial cutaway elevational view of Embodiment 2. The similar reference numerals designate the similar elements in Embodiment 1 and the explanations thereof are omitted.

Although in Embodiment 1 the whole signal line 240 was buried in the coil case 200 and plug cap 210, it may be disposed outside the coil case 200 and plug cap 210.

Embodiment 3

Figure 8:
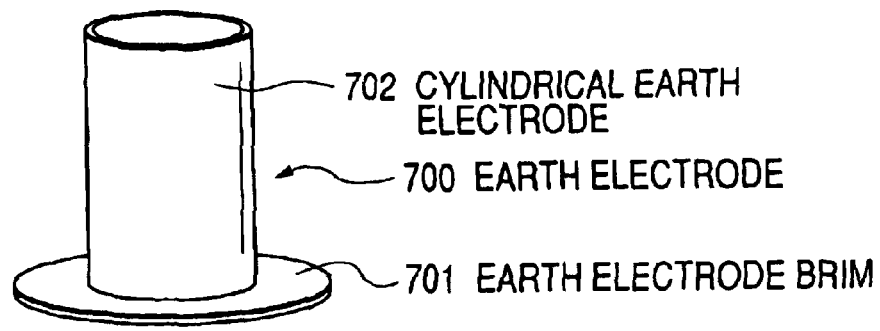
FIG. 8 is a perspective view of a main portion of the ignition apparatus of Embodiment 3.

FIG. 8 is a perspective view of a main element of Embodiment 3. The same elements as in Embodiment 1 are omitted.

Although in Embodiment 1 the earth electrode (shield member) 70 was directly formed on the plug insulator 20, the earth electrode (shield member) 700 may be an independent body fitted to the plug insulator 20.

The earth electrode (shield member) 700 (made of, e.g., conductive steel) comprises: a disc-shaped earth electrode brim 701 which is disposed on the brim surface 22 of the insulator brim 21; and a cylindrical earth electrode 702 which is disposed at the outer circumference of the middle portion along the axial direction of the plug insulator 20.

Embodiment 4

Figure 9:
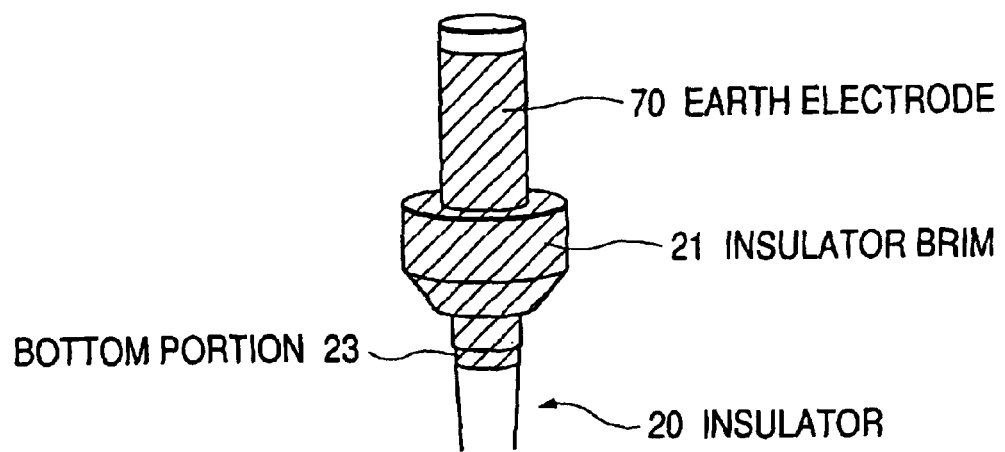
FIG. 9 is a perspective view of a main portion of the ignition apparatus of Embodiment 4.

FIG. 9 is a perspective view of a main element of Embodiment 4. The same elements as in Embodiment 1 are omitted.

Although in Embodiment 1 the earth electrode (shield member) 70 was provided both on the brim surface 22 and the outer circumference surface of the insulator 20 at the middle portion along insulator axial direction as shown in FIG. 4A, the earth electrode (shield member) 70 may be extended to a bottom portion 23 of the insulator brim 21.

Further, a metal sealing ring may be held between the bottom portion 23 and the inner circumference of the hausing 10, improving the shielding capability of the high frequency spark discharge noise. Further, the earth terminal 231 in Embodiment 1 can be abolished, because the earth electrode is grounded by the bottom portion 23, metal sealing ring and hausing 10.

Other Embodiment

Although in Embodiment 1 the insulating layer (insulating member) 80 was formed, the insulating layer (insulating member) 80 may be replaced by a PTFE tube.

What is claimed is:

1. An ignition apparatus for an internal combustion engine comprising:

a spark plug wherein a signal electrode for detecting a combustion pressure is provided at an outer circumference of a plug insulator buit-in center electrode;

a holding member which covers said outer circumference of said plug insulator and has a signal terminal connected with said signal electrode; and a plug cap fixed to said holding member, covers said outer circumference of said plug insulator and is connected with an ignition coil, wherein:

an electrically grounded shield member is provided on said outer circumference of said plug insulator; and said shield member is insulated from said signal electrode.

2. The ignition apparatus according to claim 1, wherein said shield member is a metal paste coated on said outer circumference of said plug insulator.

3. The ignition apparatus according to claim 1, wherein said shield member is a conductive body fitted to said outer circumference of said plug insulator.

4. The ignition apparatus according to claim 1, which further comprises an insulating member provided between said shield member and signal electrode.

5. The ignition apparatus according to claim 1, which further comprises an insulating body fitted to said outer circumference of said plug insulator, wherein said signal electrode is provided on said insulating body.

6. The ignition apparatus according to claim 1, wherein said shield member is provided on a whole surface opposite to said signal electrode.

7. The ignition apparatus according to claim 1, which further comprises:

a cap cover for covering said plug cap; and a shield plate for shielding an electrical noise provided on said cap cover around said signal electrode and signal terminal.

* * * * *